US011626986B1

(12) United States Patent
Horoszczak et al.

(10) Patent No.: US 11,626,986 B1
(45) Date of Patent: Apr. 11, 2023

(54) METHOD AND SYSTEM OF RESCINDING ACCESS TO BLOCKCHAIN DATA

(71) Applicant: Billon Group Limited, London (GB)

(72) Inventors: Andrzej Horoszczak, Warsaw (PL);
Remigiusz Czerwiński, Warsaw (PL);
Rafał Łukasz Czaja, Warsaw (PL);
Michał Wichulski, Warsaw (PL);
Jeffrey Arthur Deneau, Warsaw (PL)

(73) Assignee: Billon Group Limited, London (GB)

(*) Notice: Subject to any disclaimer, the term of this patent is extended or adjusted under 35 U.S.C. 154(b) by 0 days.

(21) Appl. No.: 16/041,985

(22) Filed: Jul. 23, 2018

Related U.S. Application Data

(60) Provisional application No. 62/537,650, filed on Jul. 27, 2017.

(51) Int. Cl.
*H04L 9/08* (2006.01)
*H04L 9/32* (2006.01)
*G06F 16/27* (2019.01)
*H04L 9/00* (2022.01)

(52) U.S. Cl.
CPC .............. *H04L 9/088* (2013.01); *G06F 16/27* (2019.01); *H04L 9/0825* (2013.01); *H04L 9/3255* (2013.01); *H04L 9/50* (2022.05)

(58) Field of Classification Search
CPC ..... H04L 9/088; H04L 9/3255; H04L 9/0825; H04L 2209/38; G06F 16/27
See application file for complete search history.

(56) References Cited

U.S. PATENT DOCUMENTS

| | | |
|---|---|---|
| 2007/0005978 A1 | 1/2007 | O'Connor et al. |
| 2008/0040602 A1 | 2/2008 | Williams et al. |
| 2017/0344580 A1* | 11/2017 | King ................ G06F 16/137 |
| 2018/0204192 A1* | 7/2018 | Whaley ............ G06Q 20/0658 |
| 2018/0316492 A1* | 11/2018 | Ramachandran ..... H04L 9/3239 |
| 2019/0036712 A1* | 1/2019 | Qiu ................... H04L 9/0637 |
| 2019/0238323 A1* | 8/2019 | Bunch ............... H04L 9/0825 |
| 2020/0065501 A1* | 2/2020 | Murphy ............. G06F 21/602 |
| 2020/0153627 A1* | 5/2020 | Wentz ............... G06F 21/6209 |

* cited by examiner

*Primary Examiner* — Patrick McAtee
*Assistant Examiner* — Vincent I Idiake
(74) *Attorney, Agent, or Firm* — Marin Patents LLC; Gustavo Marin

(57) ABSTRACT

A method of rescinding access to blockchain data may include the addition of metadata to an entire blockchain or to component blocks in a blockchain which contain the encrypted keys for each owner or otherwise authorized party. Said metadata may be added when a block is created, including metadata to store state and communicate information. After a blockchain is published, an authorized party may request rescission of access to one or more blocks or the entire blockchain by appending one or more instruction blocks to the chain. The other parties authorized to access this block or blockchain may agree to said request. If a sufficient number of parties have agreed to rescind, the removal of access keys may be publicly confirmed with the result that the original data held within the block or blockchain can no longer be decrypted.

5 Claims, 7 Drawing Sheets

METHOD AND SYSTEM OF RESCINDING ACCESS TO BLOCKCHAIN DATA

CROSS-REFERENCE TO RELATED APPLICATIONS

This application claims the benefit of U.S. Provisional Application No. 62/537,650, filed Jul. 27, 2017

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more embodiments of the invention relate to communication systems and information security. More particularly, one or more embodiments of the invention relate to a method to rescind access to blockchain data.

BACKGROUND OF THE INVENTION

Blockchains are used as a public ledger in which to store various types of data in a list of records called "blocks". By design, blockchain-based systems disallow the modification of existing published blocks of data. Any modification made to a block of data will change its hashsum and the hashsums of any subsequent blocks in the chain. This new hashsum will identify the data as having been changed to any examiner, and said block will be rejected by the validation and replication process. It is possible to sign the block with a certificate which expires on a specific date, but such a date may not be known in advance—for example when an external party like a judicial court orders the removal of data. It is also possible to revoke the certificate of the party which signs the block, but this will also revoke the validity of every block signed by the party. Further, revoking the certificate does nothing to prevent the data in the block from being accessed and viewed. Ergo, while the restriction on modifying data is central to blockchain's ability to provide trust between otherwise untrusting parties, it limits the feasibility of using blockchain-based solutions where data access may later be revoked at any time. The storage of medical records, durable media, private data, government identification, and the like on blockchain would be well served by a blockchain design which respects the immutability of existing blocks yet provides a secure method to rescind access to the block data content.

BRIEF SUMMARY OF THE INVENTION

The present disclosure provides a description of systems and methods for rescinding access to data published in a blockchain by applying an "obsolescence lock". In some embodiments, the system may include an obsolescence lock which may be associated with a block or blockchain through metadata. An obsolescence lock enables the deletion of the keys which provide access to either a single block or to a plurality of blocks within a blockchain. Without the access keys, the encrypted data contained within in a block is undecipherable. As, by definition, published blockchain data may not be modified, the method implementing an obsolescence lock must add and sign new blocks, providing proof of authorized key deletion.

In some embodiments, a method for associating metadata with newly appended blocks includes: generating, by a generation module of a processing computer, metadata which contains the fields and instantiated cryptographic public key data that define an obsolescence lock; and dividing the associated related cryptographic private key into secret shares which may be divided amongst parties authorized to access said block.

In some embodiments, a method for rescinding access to a block or blockchain includes: submission, by a party, of an instruction block requesting submission, by a party, of an instruction block requesting the rescission of a specific block or blockchain; transmission, of the secret share to each owner or authorized party related to the block or blockchain; submission, by an agreeing party, of an instruction block agreeing to the rescission request; reconstruction, by the agreeing party that inclusively has comprised the required number of agreeing parties, of the private key of the obsolescence lock; submission, by the agreeing party that inclusively has comprised the required number of agreeing parties, of an instruction block confirming the rescission request; and removal, by the agreeing party that inclusively has comprised the required number of agreeing parties, of all encrypted CEKs; thereby rescinding access to the original data within the block or blockchain.

In further embodiments, a system for applying an obsolescence lock to blocks or blockchains includes: a data management and communication software module operating on an access device; a data management, verification, replication, storage, and communication software module on a processing server.

In still further embodiments, a system for applying an obsolescence lock to blocks or blockchains includes: a data management and communication module operating on an access device; a data management and communication module of a processing web server; a data management, verification, replication, storage, and communication software module on a processing server.

BRIEF DESCRIPTION OF THE DRAWINGS

Embodiments of the present disclosure are best understood from the following detailed description of exemplary embodiments when read in conjunction with the accompanying drawings. Included in the drawings are the following figures.

DETAILED DESCRIPTION OF THE INVENTION

Glossary of Terms

Figure 1:
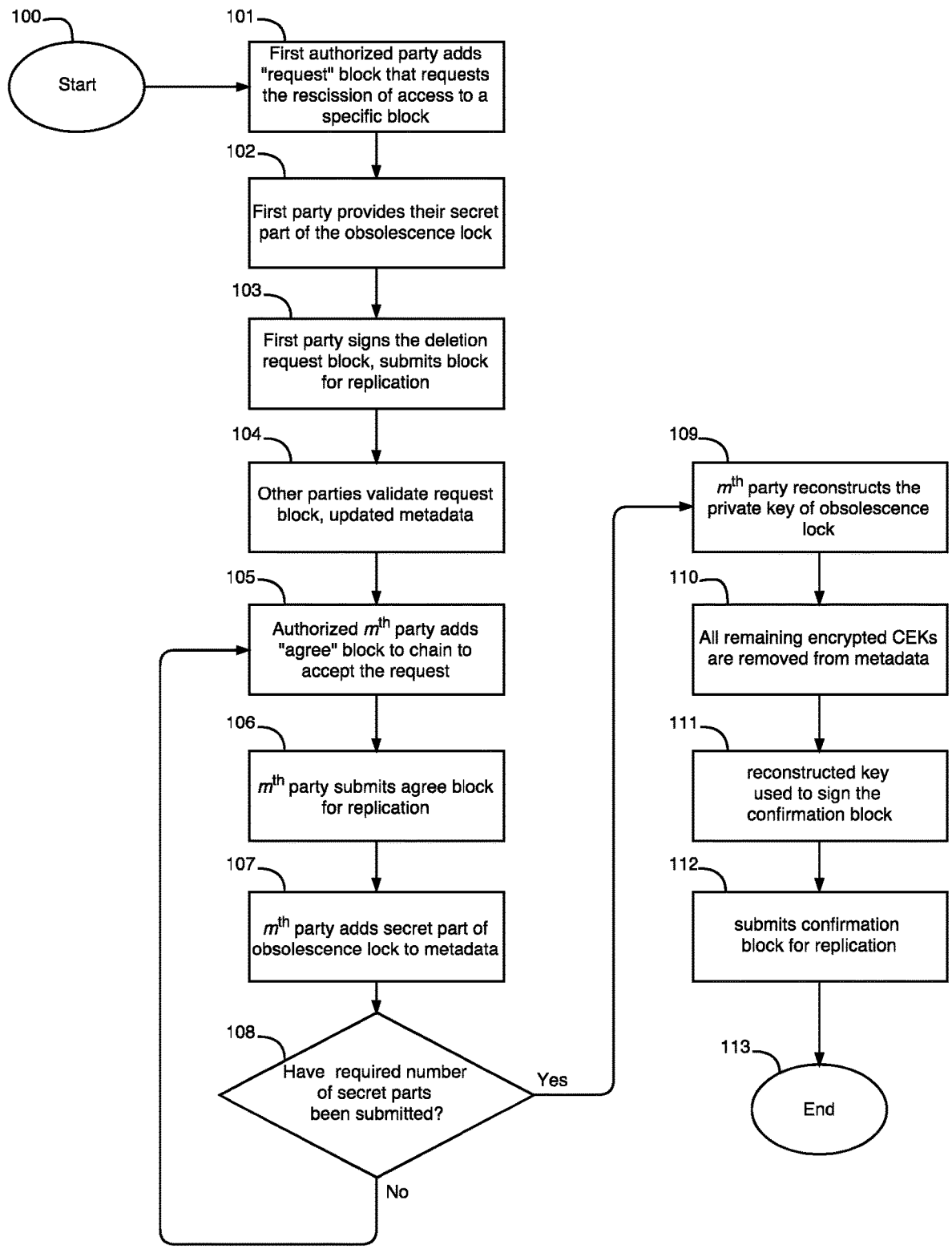
FIG. 1 illustrates an example method by which access to a block of data may be rescinded by the application of an obsolescence lock according to various embodiments described herein.

Network—The network enables communication between system components. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The network may use communication protocols including Transmission Control Protocol (TCP) or User Datagram Protocol (UDP), proprietary protocols, the like, or any combination thereof. The preferred embodiment has security features applied to the network, including but not limited to secure or cryptographic protocols such as Transport Layer Security (TLS), Secure Sockets Layer (SSL), HTTP Secure (HTTPS), and the like. Further, the preferred embodiment applies additional point-to-point security schemes such as Virtual Private Networks (VPN) to create secure virtual tunnels to transmit data across security, physical, geographic, or topological barriers.

Web Browser—Representative Web Browsers include, among others, Microsoft Internet Explorer (all versions), Google Chrome (all versions), Mozilla Firefox (all versions) or the like, each of which are downloadable software programs. These software programs are able to connect, retrieve, and display web pages hosted on a Web server and run certain client-side scripting languages that can dynamically logical functionality.

Web server—The web server (sometimes referred to as a "web site") hosts formatted image, text, files, objects, and scripting logic. Representative web server software includes, among others, Apache HTTP Server (all versions), Apache Tomcat (all versions), Microsoft IIS (all versions), or the like, each of which are downloadable software programs. In the website Internet paradigm, a network path to a server is identified by a so-called Uniform Resource Locator (URL). The World Wide Web is the Internet's multimedia information retrieval system. In particular, it is a collection of web servers of the Internet that use the Hypertext Transfer Protocol (HTTP) and derivatives, which provides user access to formatted files using languages such as Hypertext Markup Language (HTML), Cascading Style Sheets (CSS), and the like, as well as client-side scripting languages such as JavaScript and the like. Web servers also can present or manage data through server-side scripting languages such as PHP, Perl, ASP, and the like.

Hash Algorithm/Hash Function—The term "hash algorithm" or "hash function" refers to a mathematical algorithm that maps data of an arbitrary size into data of a fixed size. This algorithm is a deterministic one-way function that is infeasible to invert and is collection resistant such that 2 different data inputs do not create the same output hash. The fixed-size output of a hash function is called the "hash", or "checksum", or "hashsum". Cryptographic hash functions are used to provide information security for example, authentication in digital signatures, and as a checksum to detect changes in data caused by transmission errors or modification.

Blockchain—The term "blockchain" or "block chain" is a distributed database that is used to maintain a public ledger of records called "blocks". One or more computing devices may comprise a blockchain network, which may be configured to process and record data in one or more blocks of one or more blockchains. Each block encapsulates data, including but not limited to, transaction data, document or record data, system instruction data, notification data, communications data, timestamp, addresses, participants, processing logic, and the like. Said data is added to the end of the current "chain" of blocks by creating a new cryptographic hashsum combing the hashsum of the previous last block in the chain, and a hash of the new block's encapsulated data. Other data and metadata may also be included as inputs to the hashsum. Any changes to the data in a block or a predecessor block will create a corresponding new hashsum. In this manner blockchain systems can determine if any blocks within the chain have been modified.

Public Key Cryptography—The term "public key cryptography", or "asymmetrical cryptography" refers to a cryptographic system that uses pairs of keys. The public key of the pair is widely disseminated, while the private key is only known to the owning party. Public key cryptography enables authentication and validation, with the public key used to verify that the owner of the private key signed data. Public key cryptography also enables encryption, where the public key is used as a cypher on data that can only be decrypted using the private key.

The present disclosure is to be considered as an exemplification of the invention, and is not intended to limit the invention to the specific embodiments illustrated by the figures or description below.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, and components have not been described in detail as not to unnecessarily obscure aspects of the present invention.

FIG. 1 is a flowchart which illustrates an example method by which access to a block of data may be rescinded by the application of an obsolescence lock.

Step 100 represents the start of the workflow to rescind access to a block through the use of an obsolescence lock. In this exemplary workflow, one or more blocks of data have been written to a blockchain. All parties discussed in this example are assumed to be authorized to read the specific block in question and may request and agree to rescind keys to the block via an obsolescence lock. Also, all parties may modify the metadata for said block. Further, each authorized party has previously been given a secret share of the private key for the obsolescence lock and their personal encrypted Content Encryption Key (CEK) was added to the metadata for the specific block. In preferred embodiments, an obsolescence lock may comprise a cryptographically secured set of key data and blockchain blocks which describe the current state of a request to rescind access to data on one or more blocks in the blockchain. In preferred embodiments, the obsolescence lock may comprise an asymmetric key pair, or parts thereof, and "instruction" blocks which may be added to the blockchain. Said instruction blocks may comprise one or more well-known instructional enumerations which detail the current status of a request to rescind access to the data in one or more blocks. In preferred embodiments, the instructional block data itself may be unencrypted data. In other exemplary embodiments, the data may be instructional block data may be encrypted if all authorized parties are able to decrypt it through some cryptographic method. In preferred embodiments, key data for an obsolescence lock may be associated with an individual block through that block's metadata. In such embodiments, the instruction blocks may be added to the same blockchain as the block for which data access rescission has been requested. In further preferred embodiments, where an obsolescence lock is associated with the entire chain, the key data for an obsolescence lock may be associated with the metadata for an "obsolescence instruction block" that has been added to the blockchain, or the metadata for the genesis block of blockchain. The "obsolescence instruction block" is one example of the well-known enumerations comprising instruction blocks, in this instance it may hold the state of a request to rescind one or more blocks in a blockchain. In such embodiments, all instruction blocks may be added to the same blockchain for which rescission to the data has been requested. The CEK may comprise a symmetrical key which may be used to encrypt the original "plaintext" data or, when applied again, potentially with a transformation, decrypt the encrypted data "ciphertext". Other exemplary embodiments may use asymmetric key encryption, or other cryptographic methods to encrypt and decrypt the data.

In step 101, the first authorized party wants to rescind all parties' access to the data in a specific block. In preferred embodiments, the first party may add a new "Request Rescission" or "Request" instruction block to the blockchain. In further preferred embodiments, said block's data may comprise a well-known identifier or enumeration that declares this block is an instruction to delete a specific block. The block address to delete may also specified. In further preferred embodiments, this block's contents may not be encrypted. Other exemplary embodiments may encrypt the contained data, which requires communication of the key to all required parties. In further preferred embodiments, the request may be related to a specific block in the blockchain. Other exemplary embodiments allow the request to relate to multiple blocks or an entire blockchain In step 102, the first party may provide their part of the secret share that comprises the private key of the obsolescence lock. This part of the secret share may be written into the metadata associated with the block for which rescission has been requested. In preferred embodiments, the metadata for said block may be signed by the first party to provide proof of modification. In other exemplary embodiments, signing the metadata may not occur.

In step 103, the first party may sign this request block with their private key, which provides proof of their identity in making the request to rescind. Upon signing, the block and its metadata may be written to the blockchain. In some exemplary embodiments, the requesting party may delete their personal encrypted CEK from the metadata at the same time as they submit a request instruction block. This would deny themselves future access to the data, but not affect others who have not yet agreed to the rescission request.

In step 104, the new request block and the updated metadata of the block targeted for rescission may be sent to other participants in the blockchain system, requesting replication. In preferred embodiments, the new block (along with the entire blockchain) preferably must pass a validation process at each participant before they allow this block to be added to their copy of the blockchain. The block hashsum of each block in the chain examined for consistency against the previously published blocks/blockchain. In the event any data or meta data was modified or a hashsum was altered, the replication will fail as the associated block is inconsistent. Assuming all previous blocks are deemed valid, the new "Request" instruction block may be examined. The predecessor block hashsum may be validated. The "Request" instruction contained within the block may be recognized by the system. The block to have keys rescinded may be examined, and the party that created the new block may be confirmed as authorized to make the request. With the instruction block verified, replication of this instruction may be authorized, and all data and metadata are accepted by other nodes in the network.

Step 105 requires another party to agree to the initial request. When another party (henceforth called the second party, or the $n^{th}$ party in the general case) who owns or is authorized to rescind access to this blockchain receives and replicates the instruction, they may perform additional actions. This party may either approve or ignore the deletion request in either a manual or automated process. Examples of manual processes may involve notifying authorized people through email, messenger, SMS, and the like. Automated processes may be based upon rule criteria and the data, for example automatically approve deletion requests on blocks created prior to 2 years before.

In the event the second party ignores or does not approve the request, then nothing happens after replicating the deletion request. No data has been deleted and the new request block will be ignored.

Step 405 occurs when the second party (or $n^{th}$ party in the general case) approves the deletion, they may add a new instruction block to the blockchain after the deletion request. This new block may be the "Agree to Rescind" or "agree" instruction block. In preferred embodiments, said block's data comprises a well-known enumeration that declares this block is a special instruction that agrees to a request to rescind keys for a specific block. The specified block's address may be also specified. In preferred embodiments, this block's contents may not be encrypted. Other exemplary embodiments may encrypt the contained data, which requires communication of the key to all required parties.

The private key of the second party may be used to sign the block that agrees to the deletion request, which provides proof of their identity. In some exemplary embodiments, each agreeing party may delete their personal encrypted CEK from the metadata at the same time as they submit an agree instruction block. This would deny themselves future access to the data, but not affect others who have not yet agreed to the rescission request.

In step 106, the second party (or $n^{th}$ party in the general case) may submit the "Agree" instruction block to other network participants for verification, validation, and replication.

In step 107, the second party (or $n^{th}$ party in the general case) may add their part of the secret share for the private key of the obsolescence lock to the metadata for the block targeted for rescission. In preferred embodiments, they may sign the metadata with their private key to confirm their identity is behind the update.

Step 108, is a conditional, the path chosen dependent upon the number of secret shares submitted by authorized parties for the obsolescence lock. The second party may check if there exist sufficient secret shares written to the metadata of the block marked for deletion to reconstruct the private key of the obsolescence lock. In preferred embodiments, the secret share may comprise only 2 parts, so the second party is able to reconstruct the private key of the obsolescence lock. The second party may now retrieves their part of the secret share that comprises the private key of the obsolescence lock. In other exemplary embodiments, the number of required secret shares t may be larger than 2. In these embodiments, in the event that there are not sufficient secret shares, the workflow returns to step 105, waiting for additional parties to agree to the request. In the event there are a sufficient number of secret shares received with the inclusion of the current party's agreement, the workflow proceeds to step 109.

In step 109, the second party (or $n^{th}$ party in the general case) reconstructs the private key of the obsolescence lock using their own secret share and all those previously secrets submitted to the metadata by other parties who have already agreed. In some exemplary embodiments, reconstructing the private key of the obsolescence lock from the secret shares may require a particular sequence. In such embodiments, the sequence information may also be stored to and read from the metadata.

Steps 109-112, may vary in the number of times parties create confirmation blocks. Also, in preferred embodiments, the obsolescence lock mechanism may be configured according to the allowance of one or more parties writing to the blockchain after a request to remove a block has been sent, but before an agreement and confirmation instruction block has been written. This configuration determines the protocol used to prevent any loss of data in simultaneous block additions or modifications. The determination of the protocol to use depends upon the specific use of the blockchain, in part whether additional blocks contain alterations of previous blocks of data, or are independent versions.

3 Step Process:

In preferred embodiments, a shorter process may be used when the deployment does not need to prevent simultaneous writes to the blockchain during the obsolescence process. The following describes this shorter three step process starting after the second party signs the agreement block with their key:

In step 110, the reconstructed private key of the obsolescence lock may be used to validate the destruction of the encrypted CEKs. The second party (or $n^{th}$ party in the general case) removes the keys which can decrypt the CEK for both the first and second parties from the metadata. Without these keys, and without the CEK there is no way to decrypt the original data. The metadata for block with keys marked for deletion may be signed by the second party (or $t^{th}$ party in the general case), proving they have altered the data. A new instruction block may be added to the blockchain after the "agree" block. This new block is the "Confirm Keys Destroyed" or "confirm" instruction block. In preferred embodiments, said block's data may comprise a well-known enumeration that declares this block is a special instruction that agrees to a request to rescind a specific block. The address of the agreed-upon block to be rescinded may be also specified. In preferred embodiments, this block's contents are not encrypted. Other exemplary embodiments may encrypt the contained data, which requires communication of the key to all required parties.

In step 111, The "confirm" block may be signed with the reconstructed private key of the obsolescence lock. This proves that the key was properly reconstructed, which in turn required sufficient shared secrets to have been collected. In preferred embodiments, the second party (or $t^{th}$ party in the general case) may purge the reconstructed private key of the obsolescence lock from main and secondary memory.

In step 112, the "confirm" block, and the updated metadata with of the target block are ready, and these additions and updates are then submitted for replication. Each party that receives the obsolescence "agree" and "confirm" block notices and request to replicate must verify and validate said changes. The party that receives the update verifies the signature on the agree instruction block was signed by the second party (or & party in the multiple party case and that a sufficient number of agree blocks now exist to invoke the obsolescence lock). In preferred embodiments, the metadata associated with the block with keys marked for rescission may be examined for the removal of all copies of the encrypted CEK from the metadata and the removal of all shared secrets related to the private key of the obsolescence lock confirmed. Said metadata may also be confirmed to be signed with the valid signature of the obsolescence lock. In preferred embodiments, the general state of the blockchain may also be examined, confirming that the rescission instruction, agreement instruction, and confirmation of key destruction have all been executed in the proper order and are correctly merged with any other newly added blocks to the chain. Upon verifying and validating the additions and changes to the blockchain the changes are accepted locally and replication continues by passing on the update to adjacent nodes in the blockchain network.

The encrypted CEKs are no longer available to either the first or second party (or in other exemplary embodiments any party where there are more than 2 parties). No participant possesses the means to decrypt and access any underlying data in the block.

n-Step Confirmation:

In preferred embodiments, a longer process may be used when the deployment seeks to prevent conflicting simultaneous writes to the blockchain during the obsolescence process. The following describes this longer n-step process starting after the second party signs the agreement block with their key (where n is the number of parties who have encrypted CEKs contained in the metadata of the block marked for key deletion):

Returning to step 110 in the n-Step confirmation case, the reconstructed private key of the obsolescence lock may be used to validate the destruction of the keys. The second party (or $t^{th}$ party in the general case) removes the keys which can decrypt the CEK for only the second party from the metadata. Without this key, and without the CEK there is no way for the second party to decrypt the original data. The metadata for block with keys marked for deletion may be signed by the second party (or $t^{th}$ party in the general case), proving they have altered the data. A new instruction block to the blockchain after the "agree" block. This new block may be the "Confirm Keys Destroyed" instruction block, declared by the second party (or $t^{th}$ party). In preferred embodiments, said block's data may comprise a well-known enumeration that declares this block is a special instruction that agrees to a request to rescind the keys of a specific block. The agreed-upon block address to be deleted may also be specified. In preferred embodiments, this block's contents are not encrypted. Other exemplary embodiments may encrypt the contained data, which requires communication of the key to all required parties.

In step 111 of the n-Step confirmation case, said "confirm" block may be signed with the reconstructed private key of the obsolescence lock. This proves that the key was properly reconstructed, which in turn required sufficient shared secrets to have been collected. Further, the second party must sign the confirm block with their own private key, to confirm it is they who used the lock.

The second party may now write the reconstructed secret that comprises the private key of the obsolescence lock into the metadata for the block marked for key deletion. In some exemplary embodiments, the second party may also sign the metadata with their private key to prove their identity as modifier.

In step 112 of the n-Step confirmation case, the "confirm" block may be submitted, as well as the updated metadata with the deleted key, and the reconstructed private key for the obsolescence lock, to the blockchain network for replication.

Each party that receives the obsolescence agreement, the deletion confirmed notice, and the request to replicate may verify and validate said changes. The party that receives the update verifies the signature on the agree instruction block was signed by the second party (or $t^{th}$ party in the multiple party case and that a sufficient number of agree blocks now exist to invoke the obsolescence lock). In preferred embodiments, the metadata associated with the block with keys marked for deletion may be examined with the removal of all copies of the encrypted CEK from the metadata and the removal of all partial shared secrets related to the private key of the obsolescence lock confirmed. Said metadata may also be confirmed to be signed with the valid signature of the obsolescence lock. In preferred embodiments, the general state of the blockchain may also be examined, confirming that the deletion instruction, agreement instruction, and confirmation of key destruction have all been executed in the proper order and are correctly merged with any other newly added blocks to the chain. Upon verifying and validating the additions and changes to the blockchain the changes are accepted locally and replication continues by passing on the update to adjacent nodes in the blockchain network.

The first party (and the other involved owners and otherwise authorized parties who have an encrypted key in the metadata for the block marked for deletion) will receive, verify, and validate the updated blockchain data. Each party may then add a new "confirm" block signed by both the obsolescence lock's private key and their own private key. Further, each party may delete their encrypted CEK from the metadata of the block marked for deletion, then in some embodiments sign the updated metadata with their private key. In preferred embodiments, the $t^{th}$ party (where t is the minimum required number of parties required to obtain the obsolescence lock) to delete their encrypted CEK from the metadata may also delete all remaining encrypted CEK keys as well as the private key for the obsolescence lock from the metadata. In other exemplary embodiments, this last step does not have to be performed, as their personal signatures are sufficient proof of identity. After each party writes their new "confirm" block they submit the updated blockchain and metadata to the network for replication.

Once enough required parties have agreed to and confirmed the deletion of their encrypted CEK to the block marked for deletion, any remaining encrypted CEK keys may be removed. After the removal of all encrypted CEK keys is complete, no party has access to the unencrypted data of the block.

In preferred embodiments, similar methods may be used to rescind an entire chain of blocks in a blockchain. First, the previously described method may be applied sequentially to each block in the blockchain in any sequence to rescind the entire chain.

Other exemplary embodiments may instead introduce the concept of an "obsolescence instruction block". This exemplary embodiment differs from preferred embodiments in that the Genesis Block now has associated metadata as well, and that metadata contains the encrypted CEK for each party that is associated with every block in the chain. Also, the metadata associated with the Genesis Block contains the public key portion of the obsolescence lock. When the Genesis Block is created the private key for the obsolescence lock is divided into secret shares and distributed to every owner or otherwise authorized party.

To rescind all keys in the chain, the first party must add a new block to the chain which maintains the state of a rescission request associated with the chain, this is an "obsolescence instruction block". Initially, said instruction block may comprise an instruction in the block data requesting the rescission of access to one or more blocks in the chain. The obsolescence lock instruction block is signed by the requesting party and is analogous to the "request" block from the earlier embodiment (except the obsolescence lock instruction block applies to the entire chain). The first party then updates the metadata of the Genesis Block to add their secret part of the private key for the obsolescence lock. In some exemplary embodiments, the Genesis Block may be signed, or otherwise secured by ensuring the first party is authorized. The updated blockchain is sent to other parties for verification, validation, and replication.

In embodiments where a shorter 3-step confirmation process is sufficient, the second party (through $t^{th}$ party) may agree to the request to rescind keys by adding their "agree" block to the blockchain and signing said block. Then this party creates a "confirm" block, sign that block with the reconstructed private key of the obsolescence lock, and remove their encrypted CEK from the metadata of the Genesis Block. This party then purges from main and secondary memory the encrypted CEK, and the private key of the obsolescence lock.

In embodiments where a longer n-step confirmation process is required, each $t^{th}$ party which is the required number (or $n^{th}$ party when all parties must agree) may create an "agree" block signed with their private key. Each party may also be required to create a "confirm" block signed with their private key. Each authorized party may be required to add their part of the secret share for the private key of the obsolescence lock to the metadata of the Genesis Block. Also, each party may be required to remove their encrypted CEK from the metadata for the Genesis Block. The updated blockchain may then be submitted for verification, validation, and replication.

If, during this process a sufficient number of parties have submitted their secret parts of the private key for the obsolescence lock, the current party may reconstruct said private key. All remaining encrypted CEK entries in the metadata of the Genesis Block may now be deleted, and optionally all the secret private key parts submitted. The private key of the obsolescence lock may then be used to sign the obsolescence instruction block, confirming the completion of the instruction.

After step 112 the workflow proceeds to step 113 where it may end. All encrypted CEKs have been destroyed. No party retains the ability to decrypt their CEK to in turn decrypt the data.

In further embodiments, a method of rescinding access to a blockchain or a block within a blockchain, wherein the blockchain is comprised of one or more blocks, may comprise the steps of: creation, at the time a block is created of an obsolescence lock which will support a rescission request if it is agreed upon by the required number of parties; splitting, of the private key of the obsolescence lock, into a number of secret shares; submission, by a party, of an instruction block requesting the rescission of a specific block or blockchain; transmission, of the secret share to each owner or authorized party related to the block or blockchain; submission, by an agreeing party, of an instruction block agreeing to the rescission request; reconstruction, by the agreeing party that inclusively has comprised the required number of agreeing parties, of the private key of the obsolescence lock; submission, by the agreeing party that inclusively has comprised the required number of agreeing parties, of an instruction block confirming the rescission request; and removal, by the agreeing party that inclusively has comprised the required number of agreeing parties, of all encrypted CEKs; thereby rescinding access to the original data within the block or blockchain.

In still further embodiments the method may further comprise signing the request instruction block with the private key of the requesting party.

In still further embodiments the method may further comprise adding the public key of the obsolescence lock to the metadata associated with the block or blockchain.

In still further embodiments the method may further comprise signing the agreement instruction block with the private key of the agreeing party.

In still further embodiments the method may further comprise submitting the party's portion of the secret share from which the private key of the obsolescence lock may be reconstructed.

In still further embodiments the method may further comprise signing the confirmation instruction block with the private key of the agreeing party.

In still further embodiments the method may further comprise submitting the party's portion of the secret share into the metadata associated with a block or blockchain.

In still further embodiments the method may further comprise removing the encrypted CEKs from the metadata associated with the block or blockchain.

Figure 2:
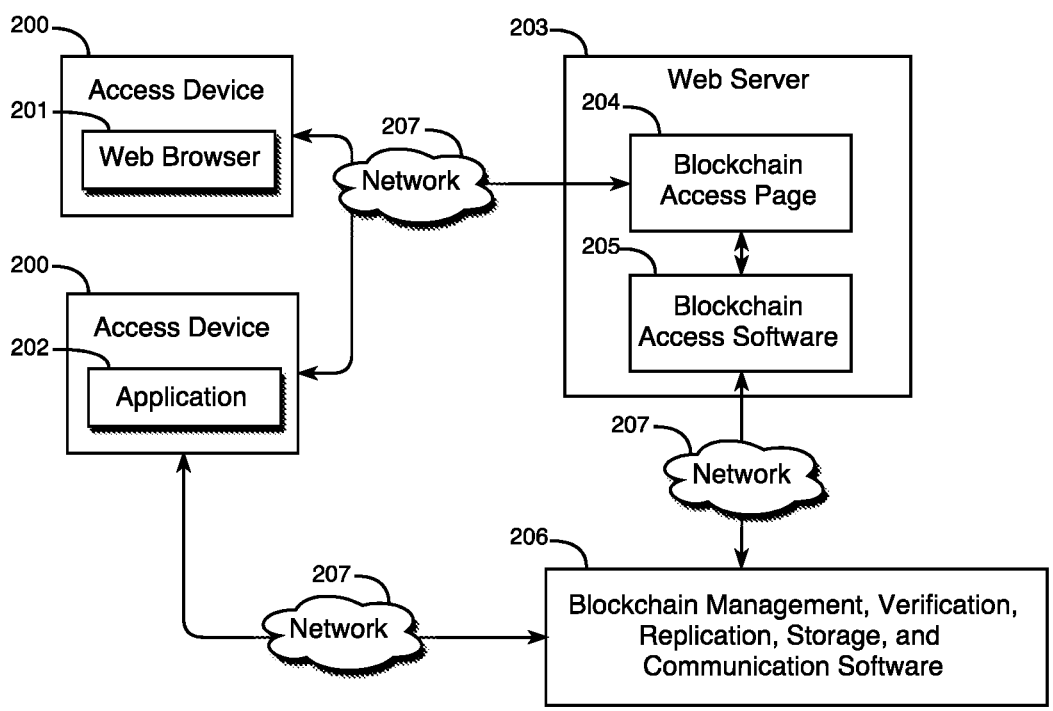
FIG. 2 illustrates an example of a high-level view of the system architecture supporting the method of applying an obsolescence lock to a block or blockchain to rescind access to data in an exemplary embodiment of the invention according to various embodiments described herein.

FIG. 2 illustrates an exemplary system used by a party to access and manage data on a blockchain. Further, this exemplary system enables said party to add an obsolescence lock to a block, or in some embodiments multiple blocks or an entire blockchain.

Element 200 is the access device the party uses to manage the blockchain and metadata, including, but not limited to, adding data blocks, adding instruction blocks, creating and updating metadata, managing keys, and obsolescence lock requests, agreements, and confirmation. By way of example only, access device 200 may be a computer, tablet, mobile phone, or another processing-capable device. In preferred embodiments, access device 200 hosts a web browser 201 or an application 202, either of which may connect via network 207 to either web server 203 or blockchain management, verification, replication, storage, and communication software 206. For illustrative purposes, the network 207 may be the Internet, an Intranet or other known connection. In the case of the Internet, the web server 203 may be a singular or plurality of physical or virtual servers which are accessible to one or more employer devices, one individual example of which is illustrated by access device 200.

Web server 203 functions as a hosting point for blockchain management operations, including services related to the obsolescence lock. The web server 203 hosts the blockchain access page 204, a web page which acts as a user interface for the party. In preferred embodiments, the web server 203 may also host blockchain access software 205, a software client that communicates and manages blockchain data over network 207 with the blockchain management, verification, replication, storage and communication software 206. In other exemplary embodiments, blockchain access software 205 may be a process hosted on a different server from the web server with communication over network 207, or be entirely incorporated within the blockchain management, verification, replication, storage, and communication software 206.

The web server 203 offers user-level blockchain management operations for parties through the blockchain access page 204. These operations include, but are not limited to, creating new blockchains, adding blocks to existing blockchains, reading data contained within blocks, reading transaction histories, performing transactions, requesting obsolescence locks, and agreeing to obsolescence locks. Other operations offered on the blockchain access page 204 may depend on the embodiment and the related use cases, for example a blockchain that supports a payment system may offer operations such as the ability to transfer funds, convert funds into other formats, and viewing payment histories. Durable media products built on a blockchain may offer document publishing and retrieval from the blockchain access page 204.

The web browser 201 displays the blockchain access page 204 to the party. Said web page 204 enables the party to manage blocks and blockchain data and implement obsolescence locks on said blocks. The blockchain access page 204 may be implemented as a single HTML or CSS web page or via multiple web pages that constitute a management function. In preferred embodiments, the blocks, blockchains, and obsolescence locks managed from the blockchain access page 204 enable the party to rescind access to the data contained within a block. Other exemplary embodiments may enable the party to rescind access to multiple blocks or an entire blockchain from the blockchain access page 204. The management tools presented on web page 204 define a User Interface (UI) for the party.

In preferred embodiments, the blockchain access page 204 communicates party requests to the blockchain access software 205. In preferred embodiments, the blockchain access software 205 may be a separate process that exists on the web server 203 or on a different server in the same secured network 207. In preferred embodiments, the blockchain access software 205 performs most business and software logic, calculations, and state data is saved or occurring on the web server 203 or a different virtual or physical server, with the remaining work performed by the blockchain management, verification, replication, storage, and communication software 206 on other access devices 200, and web servers 203. In some exemplary embodiments, the blockchain management, verification, replication, storage, and communication software 206 may be hosted on one or more dedicated server "nodes", or in a processing "cloud" service. In such embodiments, the amount of work performed in the blockchain access software 205 may be reduced.

Access device 200 can optionally use an installed software application 202 (depending on device context optionally called a "program", "application", or "app") to access the blockchain access page 204. The Application 202 may be available through mobile application "stores" such as Google Play and the Apple Store, or direct download URLs. Application 202 may itself host the blockchain access page 204 in an embedded web browser, or display the provided data in another UI format. Further, application 202 can offer more direct integration with the blockchain management, verification, replication, storage, and communication software 206. In preferred embodiments, said direct integration functionality has most business and software logic, calculations, and state data may be saved or occurring on access device 200, with the remaining work performed by the blockchain management, verification, replication, storage, and communication software 206 on separate access devices 200, and web servers 203. In some exemplary embodiments, the blockchain management, verification, replication, storage, and communication software 206 may be hosted on one or more dedicated server "nodes", or in a processing "cloud" service. In such embodiments, the amount of work performed in the application 202 may be reduced.

The application 202 and blockchain access software 205 may communicate over network 207 with the blockchain management, verification, replication, storage, and communication software 206. As mentioned, the amount of processing done by blockchain management, verification, replication, storage, and communication software 206 will vary depending on the embodiment design and available processing power on each access device 200 and web server 203. In preferred embodiments, the data management, processing, and calculations are performed predominantly on either the access device 200 or the web server 203. In preferred embodiments, this enables a distributed data processing network for managing, sharing, and sharing the blockchain data. Other exemplary embodiments may the majority or all data processing performed by the blockchain management, verification, replication, storage, and communication software 206 to a dedicated distributed or centralized system of one or more physical or virtual servers, a cloud, or similar system.

Blockchain management, verification, replication, storage, and communication software 206 may store data in various locations, including, but not limited to, in memory, either volatile or non-volatile, on disc volumes such as Hard Disk Drives (HDD), solid state storage, or removable media such as Secure Digital (SD) memory cards, clouds, remote drives, and other forms of direct or indirect storage. The blockchain management, verification, replication, storage, and communication software 206 may store formatted data such as in a relational or object-oriented Database system, exemplified by software such as Oracle Database, Microsoft SQL Server, MySQL and the like. Further software system 206 may store data in a distributed format that spans multiple memory and disc volumes or in any combination of the above. In preferred embodiments, the preference is to store blockchain and obsolescence lock related data in local memory, or on the local disk of the access device 200 or the web server 203. In other exemplary embodiments, said data may be predominantly stored on distributed, redundant devices such as on one or more servers or in a cloud.

Figure 3:
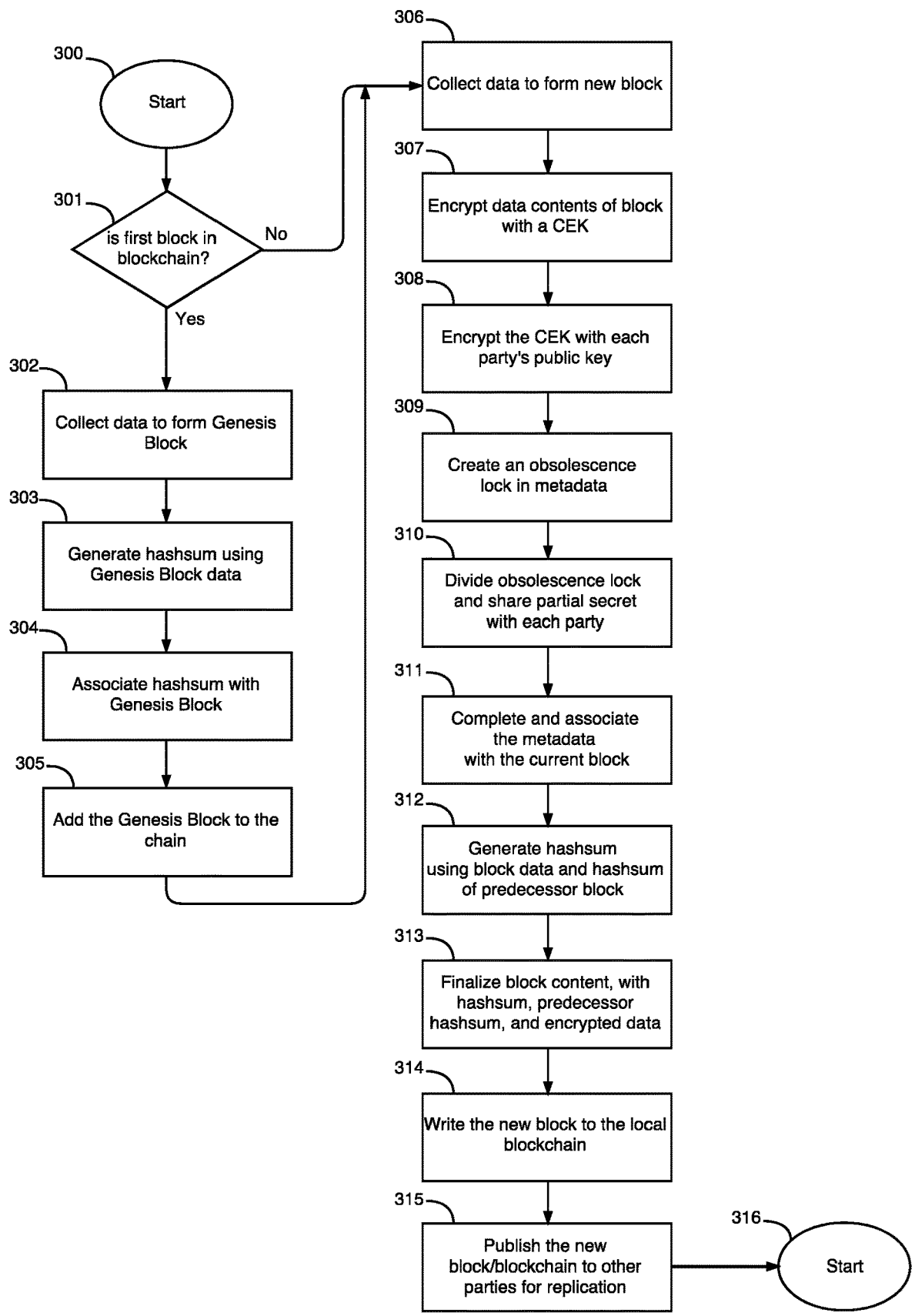
FIG. 3 illustrates an example method by which a new block can be added to a blockchain which supports an obsolescence lock mechanism according to various embodiments described herein.

FIG. 3 illustrates an example method by which a new block may be added to the blockchain which supports an obsolescence lock mechanism.

The method starts at step 300, and proceeds to step 301.

Step 301 is a conditional that directs the workflow based upon whether this block to be added is the first in the blockchain. In the event it is the first data block in this blockchain the genesis block may be added first, and the workflow proceeds to step 302.

In step 302, in preferred embodiments, the data is collected which will form a "Genesis Block". The genesis block is defined as the first block of a block chain. In preferred embodiments, the data in the genesis block details the approximate time the block was created and provides initial data that contributes to the hash sum that will be used by all subsequent blocks in the chain. In preferred embodiments, the approximate time of creation may be retrieved from an external source that may not be controlled by the invention, for example from a trusted authority which can verify the time as stated is correct. For example, a timestamp signed with the Qualified Signature of a certificate authority. Other exemplary embodiments may use as data a URL that references a well-known certificate (which itself has a creation time signed by a trusted certificate authority). Other exemplary embodiments may use a timestamp signed by a Hardware Security Module (HSM) for the data in the genesis block. Another exemplary embodiment may ask one or more nodes in the blockchain network for a time, signed by each participant's private key. Further exemplary embodiments may reference the hash sum of a publicly-known blockchain block such as Ethereum or BitCoin. Yet another example embodiment may have the block data comprised of the text, or reference to, of a well-known published work, such as a newspaper or magazine article, that, having been made public, may have the contents verified. The data stored in the Genesis Block may be a reference or non-reference data. In the various embodiments, data stored in the Genesis Block may be either encrypted or unencrypted.

In step 303, a hashsum may be calculated using a hash function with the data in the genesis block as input. In preferred embodiments, the data forming the genesis block may be provided as the input to a hash function. This function may create a fixed-size output hash, or hashsum. The same hash function algorithm must be used to validate the data. In preferred embodiments, the hash function may be collision-resistant so there is a low probability that the generated hash would match a different set of data. In preferred embodiments, a cryptographic hash function is used. Example hash functions include, but are not limited to, SHA-0, SHA-1, SHA-2, SHA-3, SHA-256 and derivatives, BLAKE, BLAKE2, and the like. Other exemplary embodiments may use provably secure hash functions. Yet other exemplary embodiments may instead use less collision-resistant functions.

In step 304, the calculated hashsum may be associated with the data in the genesis block. In preferred embodiments, this is done in the software by instantiating a data structure that contains both elements. This hashsum will be referred to as the "Block Hashsum".

In step 305, the data structure representing the genesis block and associated hashsums may be added to the blockchain. In some exemplary embodiments, there may be metadata also associated with the genesis block to be used for identifying any obsolescence locks that may be applied to one or more block or the entire chain. After adding the genesis block to the chain the workflow proceeds to step 306.

Returning to step 301, in the event the first block is already a genesis block and other blocks already in the current chain, the workflow proceeds to step 306.

In step 306, data is collected to be stored in a new data block. Said data may be provided to the party that is adding the block or it may have to be gathered by said party directly. The data stored in the new block may be a reference, or non-reference data. Data stored in the block may itself be encrypted or unencrypted.

In step 307, in preferred embodiments, the data in a new block may be encrypted with a symmetrical cryptographic key. Examples of symmetrical keys algorithms include Block ciphers and stream ciphers include, but are not limited to, AES, DES, Camellia, RC6, RC4, ChaCha, Salsa20, HC-256, Grain, Trivium and the like. The symmetric key applied to the data will be referred to as the Content Encryption Key (CEK). In preferred embodiments, the result of the data that is encrypted with the CEK may be stored in the data portion of the block 503, FIG. 5. In other exemplary embodiments, this data could be stored elsewhere and a reference to the encrypted data is instead stored in the block. In preferred embodiments, the system purges itself of the original collected data used to define the block. This includes main system memory 806, FIG. 8 and all forms of secondary memory 807, FIG. 8. Only the encrypted version of the data may remain to enhance system security.

In step 308, using public key cryptography or asymmetric cryptography, the CEK may be encrypted with the public key of the first party. Only the first party may thereafter access this copy of the CEK using their private key, as only they know their private key. Example public key cryptography techniques include, but are not limited to, RSA, DSS, elliptic curves, Paillier cryptosystem and the like. Then encrypt the CEK using the respective public key for each relevant party (either an owner of the block or otherwise authorized party with read or modify rights). Each party will be the only entity capable of decrypting their encrypted CEK (as only they know their private key).

Step 309 the "obsolescence lock" may be created. In preferred embodiments, the data associated with the obsolescence lock is partially stored in "metadata" that is associated with the block being added to the chain. Metadata is defined additional information including, but not limited to, information about the block's data content or "payload", about the state of a block, time related to the block's publication or modification, external references, keys, the obsolescence lock, internal data structures with their own information, ownership, authorization, validity, conditional operators, and governing rules. Other exemplary embodiments may see some of the data associated with the obsolescence lock stored in the data of a data block, in metadata that is associated with an entire chain, or in specially recognized instruction blocks that apply to one or more blocks or an entire chain.

Figure 5:
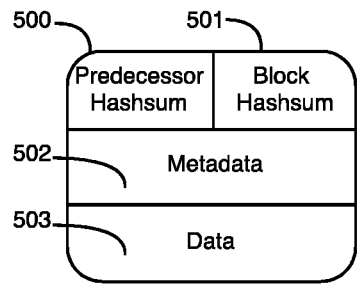
FIG. 5 is an example data structure representing a block in an illustrative blockchain. This exemplary data structure supports the application of an obsolescence lock to rescind access to the contained data according to various embodiments described herein.

In preferred embodiments, the metadata 502, FIG. 5 may be contained in the same data structure as the block, but is not part of the hashsum calculation. In preferred embodiments, changes to the metadata may be signed by the modifying party with their private key. When the changed metadata is later replicated, each receiving party validates the changes leave the metadata in a valid state, the modified metadata is signed, and the modifying party is authorized to make said changes.

In preferred embodiments, modifications to the metadata may only be performed by verified data owners or otherwise properly authorized parties. In preferred embodiments, the identities of owners and authorized parties may be stored in the metadata itself. In other exemplary embodiments, owners and authorized parties may be identified in the data of a block, or via additional fields added to the data structure that defines a data block, and may be part of the hashsum calculation or not. In preferred embodiments, modifications to the metadata may only be allowed after validation of both the state of the metadata after the operation and validation of any instructions and data passed to perform the modification. In preferred embodiments, the metadata structure may be defined in terms of associated information as well as rules which define the consistency of the data and the acceptable states of said data either singly or in aggregate. Said rules may be defined in various ways including, but not limited to, operators, a language syntax—either compiled or interpreted, and may be predefined or customizable. Other exemplary embodiments may eschew the signing of the metadata by the modifying party to validate their changes, either providing no security mechanism, or coordinating security and validation with a trusted system.

In other exemplary embodiments, the metadata may be in a separate data structure that may be referenced by the current block and maintains a reference to the current block address. In this event the metadata is also provided as input to the hashsum calculation. Other exemplary embodiments may only reference the current block from the metadata, or only reference the current block reference the metadata. In preferred embodiments, the metadata may be signed with the private key of the last party who modified it. Other exemplary embodiments may eschew signing the metadata by an authorized party, with commensurate lack of tracking and accountability. The metadata may not be used in the calculation of a Block Hashsum. Metadata may be replicated in conjunction with the associated block, subject to authorization checks and the validation of the block and metadata.

In step 309, preferred embodiments instantiate metadata that may be associated with the current block. A cryptography primitive that supports the "obsolescence lock" may be instantiated. In preferred embodiments, the obsolescence lock may be implemented with a public key cryptography primitive. A public/private key pair may be created to comprise the obsolescence lock, and the public key from this pair may be written into the metadata. This public key may be used to validate any signings made by the obsolescence lock.

In step 310, the private key of the obsolescence lock may be divided into n unique parts, where n is the number of parties authorized to add to the current blockchain or modify the current block. In preferred embodiments, n is 2, representing the first and second parties. In other exemplary embodiments, any number n parties may be used. Examples of n greater than 2 include, but are not limited to, multi-party transactions, transactions involving multiple partial owners or authors of a block of data, data which may involve regulators, observers, or arbiters, and the like. In preferred embodiments, the division of the private key into multiple parts may be accomplished by a secret sharing or secret splitting scheme. The principal characteristic of the secret sharing scheme may be the original secret (the private key) may only be reconstructed when a sufficient number of the divided shares of the secret are recombined together. In preferred embodiments, all n secrets shares must be recombined in order to recreate the original private key. In other exemplary embodiments, a threshold t, where t is less than n may be sufficient to recombine the private key. Examples of secret sharing methods include, but are not limited to cryptography techniques such as Shamir's Secret Sharing, Blakley's Secret Sharing, the Chinese Remainder Theorem, and the like.

One part of the divided private key should be given to each party who is authorized to modify or delete this block. In preferred embodiments, each party persists their portion of the private key on the receiving party's access device 200, FIG. 2 and keep it secret. In exemplary embodiments where the secret sharing scheme requires the ordering of secret shares, the position of this secret share must also be communicated to the authorized party. The secret share given to the party should be purged from main and secondary memory of all involved systems (excluding the receiving party's access device 200, FIG. 2). In preferred embodiments, the secret shares are not initially written to the metadata for the obsolescence lock, only being added later when a party agrees to the application of an obsolescence lock. In preferred embodiments, the private key is also not written into the metadata and may instead be purged from main system memory and secondary memory after having been distributed to the parties.

In step 311, the metadata may be finalized. Each party's encrypted CEK may be added to the metadata. In preferred embodiments, the system purges itself of the original CEK used to encrypt the data. This includes purging the encrypted CEK from main system memory 806, FIG. 8 and all forms of secondary memory 807, FIG. 8. Only the n encrypted versions of the CEK associated with each authorized party will remain in the metadata; decryptable only by their respective owners.

Figure 7:
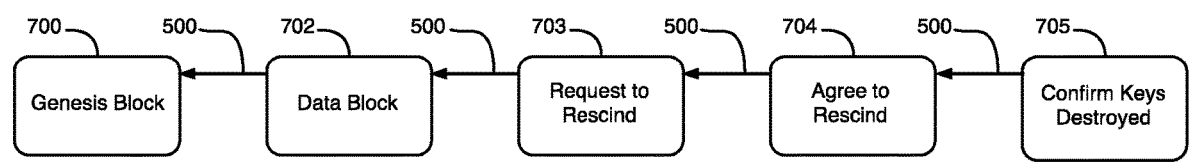
FIG. 7 is a high-level example of an instance of the preferred embodiment blockchain with an obsolescence lock applied according to various embodiments described herein.

In step 312, a hash function may be applied to the data in the current block and the block hashsum 501, FIG. 5 from the immediate predecessor block (initially the genesis block, 700, FIG. 7). In preferred embodiments, the inputs to the hash function may be the collected data that forms the current block, and the hashsum from the immediate predecessor block. The hash function may create a fixed-size output hash, or hashsum. In preferred embodiments, the hash function may be collision-resistant so there is a low probability that the generated hash would match a different set of data. In preferred embodiments, a cryptographic hash function may be used. Example hash functions include, but are not limited to, SHA-0, SHA-1, SHA-2, SHA-3, SHA-256 and derivatives, BLAKE, BLAKE2, and the like. Other exemplary embodiments may use provably secure hash functions. Yet other exemplary embodiments may instead use less collision-resistant functions.

In step 313, the calculated hashsum may be associated with the block. In preferred embodiments, this may be done in the software by assigning both the block data and the calculated hashsum as elements of a data structure. Said hashsum becomes the block hashsum 501, FIG. 5. Then the block hashsum from the immediate predecessor block is associated with the current block.

In preferred embodiments, this association may be done by adding the predecessor's block hashsum to the block's representative data structure. Said hashsum becomes the current block's predecessor block hashsum 500, FIG. 5. The block's encrypted data may also be associated with the block. The metadata may also be associated with the block. In preferred embodiments, the metadata with the public key of the party that is adding this block to the blockchain may be signed. Other exemplary embodiments may eschew signing the metadata, with a concurrent loss of accountability and tracking changes.

In step 314, the block including metadata may be added to the blockchain. If a newer version of this blockchain is received from other nodes the changes are validated and merged.

In step 315, the blockchain, including the new block and metadata and any subsequently merged changes, may be published to other parties for replication.

Step 316 represents the end of the workflow for adding a new block to the blockchain which includes an obsolescence lock mechanism.

Figure 4:
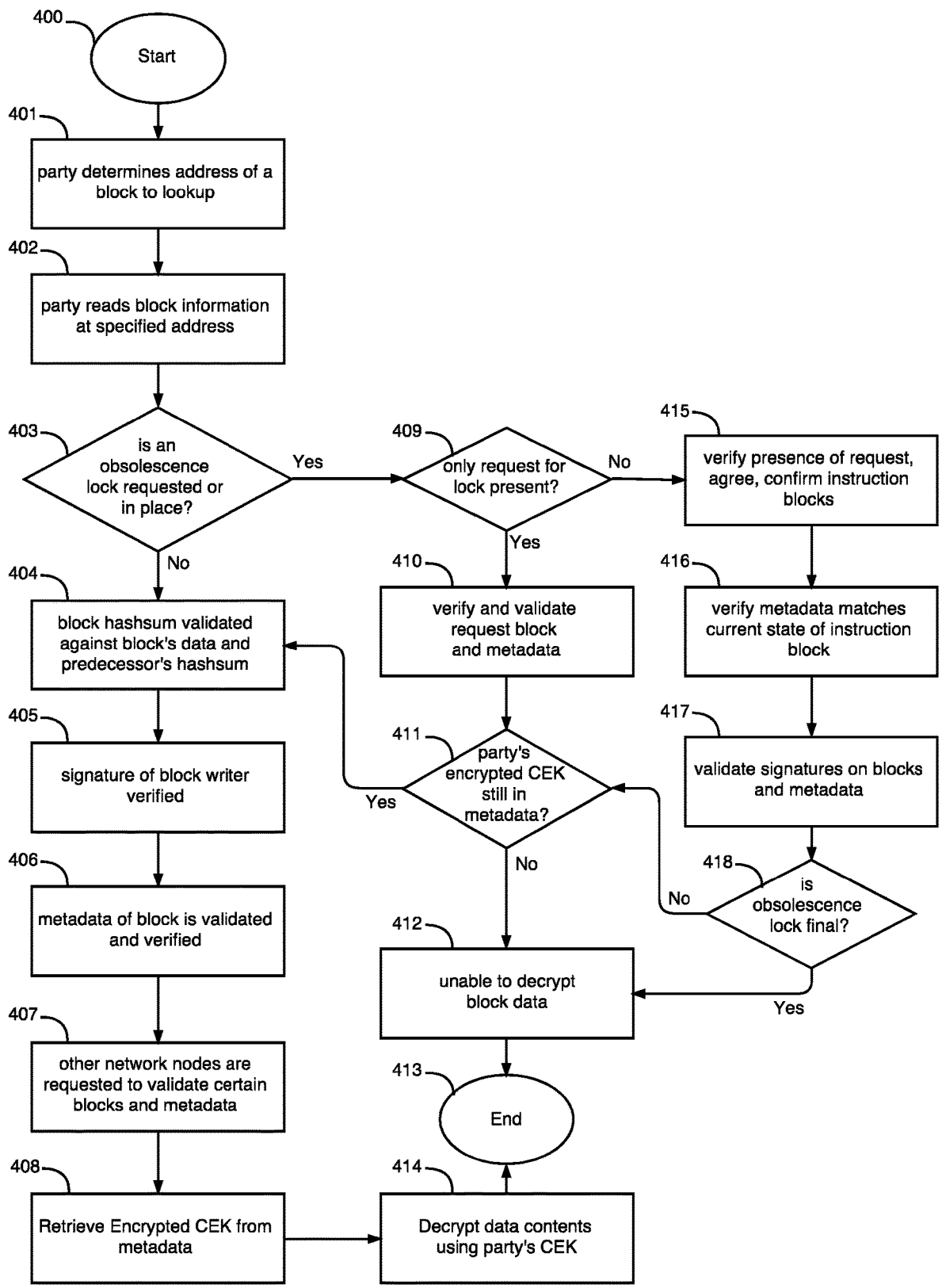
FIG. 4 illustrates an example method of accessing, verifying, and validating data in a block which may have either an associated partial or finalized obsolescence lock in place according to various embodiments described herein.

FIG. 4 is a flowchart which illustrates an example method by which the present invention may access the data in a block.

Step 400 indicates the start of the method, where a party is attempting to retrieve the data in a block. For the remainder of this example, assume the party is authorized to read the data and had an encrypted CEK stored in the metadata for the block.

In step 401, the party determines the address of the block to lookup. This address may be provided by a recurring system service such as replication, a user request to look at a document, or similar automated and manually instantiated events.

In step 402, the address may be used to find the block in the blockchain. In preferred embodiments, this lookup may be performed against a hash table which minimizes the number of nodes visited. Other exemplary embodiments may use arrays, linked lists, red black trees, or similar data computer science-based data structures to perform the lookup.

Step 403 is a conditional which determines the next step based upon the current state of the block or blockchain, and whether an obsolescence lock request is in place or not. In the event a party has requested an obsolescence lock, there will be a Request to Rescind instruction block in the chain that, in preferred embodiments, requests a specific block be targeted for key deletion. In other exemplary embodiments, there may be multiple request blocks, or a single marked request block that specifies the chain be deleted in part or whole. In the event a Request instruction block does not exist, the workflow proceeds to step 404.

Step 404 begins the verification and validation of the specified data block. The hashsum of the block may be compared against the hash of the block's data and the predecessor block's hashsum. The same hash algorithm must be consistently applied during the creation and validation of the hash. If the provided hashsum matches the calculated hash from the block's data and predecessor hashsum then this block may be consistent and the workflow progresses to step 405.

In step 405, in preferred embodiments, the signature of the creator of the block may be compared with the set of permissioned authors. In other exemplary embodiments, the signature may be checked for a valid, unexpired certificate. In yet other exemplary embodiments these checks may be eschewed.

In step 406, in preferred embodiments, the metadata of the block may be examined and any changes to the metadata are verified as being performed and signed by an authorized party. Such verification may be completed in preferred embodiments by examining the hashsums of the metadata and comparing these against the contents of the metadata. Also, the hashsum of the predecessor version of the metadata may be checked for a valid signature and changes to the metadata are verified and validated during replication. In other exemplary embodiments, the metadata may not be verified based on user, but may be validated as being in the correctly formed and in a state consistent with the presence of (or lack of) the obsolescence lock. In preferred embodiments, the hashsums of each predecessor block and associated metadata may also be validated against the contents until the genesis block is reached and validated as the terminal.

In step 407, in preferred embodiments, other parties in the blockchain network may be contacted with a request to validate the current block by comparing hashsums. In preferred embodiments, such validation may be performed with merkle trees, but other forms of hash trees and efficient data structures may be used by other exemplary embodiments. Other exemplary embodiments may eschew the validation requests made of other blockchain participants.

In step 408, the block has been verified and validated and confirmed to be true and unmodified. The party's encrypted content encryption key (CEK) may be read from the block's metadata and decrypted to reveal the unencrypted CEK. The workflow then proceeds to step 414.

In step 414, the unencrypted CEK may be applied to the block's data contents and the original data is retrieve by the party. The workflow progresses to step 413.

Step 413 represents the end of the current workflow.

Returning to step 403, in the even there is a partial or complete obsolescence lock in place on the block or blockchain, the workflow proceeds to step 409.

Step 409 is a conditional, the path of which is determined by the presence of only a Request for Delete instruction block in the chain (and not an agree or confirm block). If only the request is in place, the workflow proceeds to step 410.

In step 410, the Request block may be examined, and the signature of the creator of the block is verified as an authorized party. In preferred embodiments, the metadata of the block specified for obsolescence is also examined for the removal of the encrypted CEK associated with the party that author of the block and said party's share of the secret private key of the obsolescence lock.

Step 411 is a conditional, the path dependent upon the presence of the validating party's encrypted CEK in the metadata. Said party's encrypted CEK will still be in the metadata if said party did not request the obsolescence lock, has not already agreed to the obsolescence lock request, and in some exemplary embodiments the required number of agreements has not yet been reached to finalize the obsolescence block. In the event the encrypted CEK is still in the metadata, then the workflow proceeds to step 404 to validate the specified block and decrypt the contents. In some embodiments, the current party has the option of agreeing to and confirming the obsolescence request in this step as well. In the event the party's encrypted CEK may no longer be in the metadata then the workflow proceeds to step 412.

In step 412, the encrypted CEK may no longer be available for this party. Either a partial or full obsolescence lock may now be in place on the specified block or, in some embodiments, the entire blockchain. Without access to the underlying CEK the party can no longer decrypt the block's data. The workflow proceeds to step 413 where it terminates.

Returning to step 409, consider the case in which more than just the obsolescence request instruction may be in place. This means an agreement instruction block has been created and one or more confirmation blocks have been added to the blockchain. In this event the workflow proceeds to step 415.

In step 415, the party may validate the present state of the instructions related to the obsolescence lock in the blockchain. In preferred embodiments, the obsolescence lock request instruction block, and any agreement and confirmation instruction blocks are examined for valid signatures by authorized parties. When the embodiment requires a specific number of agreeing parties, and that number has been reached, the existence of the confirmation block is confirmed and verified to have been signed by the reconstructed private key of the obsolescence lock or the private key of the confirming party.

In step 416, the metadata associated with the block or blockchain to be made obsolete may be verified to have all encrypted CEKs removed that are associated with the requesting and agreeing parties. When the embodiment requires a specific number of agreeing parties, and that number has been reached, the metadata may be checked for the reconstruction of the private key of the obsolescence lock. In other exemplary embodiments, the metadata for the block to be obsolete may be confirmed to have had all encrypted CEK entries removed for all parties after the required number of agreement blocks has been written.

In step 417, in preferred embodiments, the metadata for the block or blockchain to be made obsolete may be checked for a valid signature of the modifying parties or the reconstructed private key of the obsolescence lock. In other exemplary embodiments which use an obsolescence lock, instruction block, or metadata on the genesis block to identify blocks or chains to be deleted, this metadata may be similarly verified to have been signed by authorized parties or the reconstructed private key of the obsolescence lock.

Step 418 is a conditional, the path of which is determined by the state of the obsolescence lock on the block or blockchain. In the event there have not been sufficient agreeing parties to reconstruct the private key of the obsolescence lock, then the current party's encrypted CEK is still in the metadata for the block to be made obsolete. In this event, the workflow proceeds to step 411. In the event the required number of agreeing parties has been met, and the confirmation block is signed by the private key of the obsolescence lock, then the obsolescence lock is in force and the workflow proceeds to step 412.

FIG. 5 is an example data structure representing a block in an illustrative blockchain. The data structure described in this illustration is not inclusive of all possible fields, and those that are included have been specified either due to their important in the basic blockchain operations, or because they are closely related to the method to rescind data access via an obsolescence lock.

Element 500 is the predecessor hashsum, storing the output of a hash function or hash algorithm of the block hashsum 501 from the predecessor block in the blockchain. In preferred embodiments, the first block in a blockchain is the "genesis block" and the predecessor hashsum may be the hash of a published blockchain from this or an external system. In other embodiments, the predecessor hashsum of the genesis block may be empty, and the data contained within is well recognized or published and represents the start of the data and an indication of a publishing date.

The predecessor hashsum is a mechanism used by blockchain to establish a history for the data contained in each predecessor blocks. If the data of a predecessor block in the chain is changed, it's hashsum will be different. As the hashsum of a block is based in part on its predecessor's hashsum, each subsequent block in the chain will have a different corresponding hashsum. Using this mechanism, the contents of each block in the chain may be validated through to the original genesis block and checked for modification.

Element 501 is the block hashsum for the current block. This hashsum is the output of a hash function or algorithm that uses the data 503 and predecessor hashsum 500 as input.

Element 502 is the metadata associated with the current block. In preferred embodiments, the metadata is not used in the calculation of the block hashsum. The metadata contains one or more fields to store data. The metadata of a published blockchain may be altered by authorized parties, subject to said party signing the metadata, then verification and validation during block replication or read requests.

Element 503 is the collected data associated with this block. In preferred embodiments, said data is typically encrypted with a Content Encryption Key or CEK to limit access only to authorized parties prior to the application of an obsolescence lock.

Figure 6:
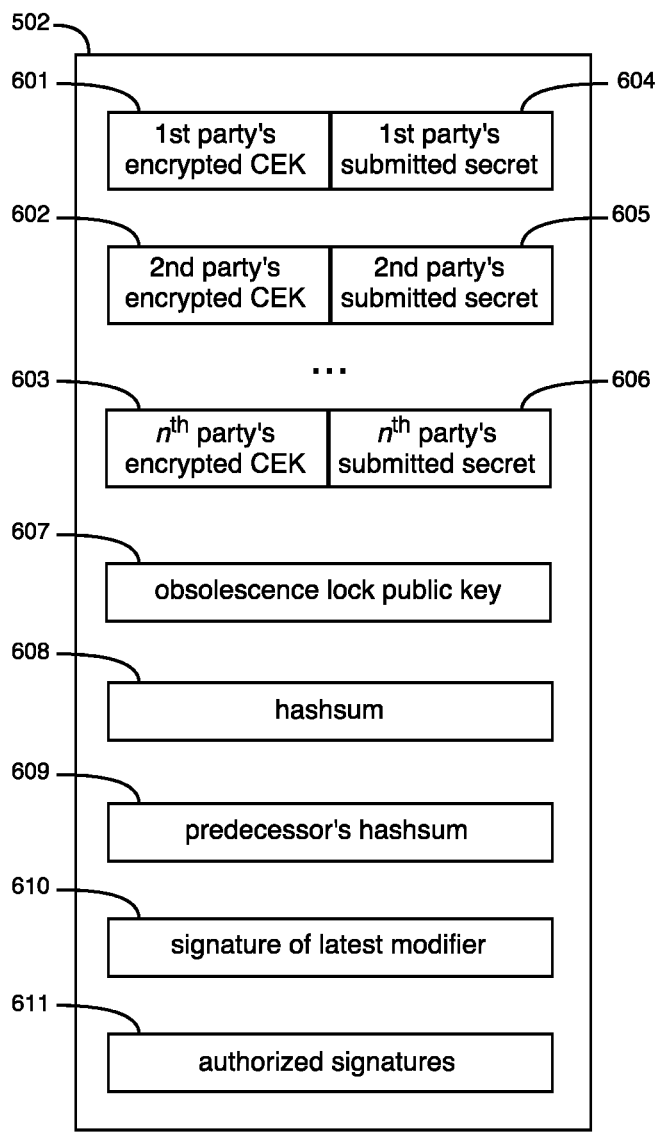
FIG. 6 is an example of a metadata data structure that supports the application of an obsolescence lock to rescind access to the associated block's data according to various embodiments described herein.

FIG. 6 is an illustrative example of a metadata data structure. The data structure described in this illustration is not inclusive of all possible fields, and those that are included have been specified either due to their important in the basic blockchain operations, or because they are closely related to the method to rescind data access via an obsolescence lock.

Element 502 represents the entire metadata data structure as described in part in FIG. 5.

Element 601 represents the field which maintains state for the $1^{st}$ party's encrypted Content Encryption Key or CEK. The encrypted CEK can only be decrypted with the private key of the $1^{st}$ party. If an obsolescence lock is applied to a block or blockchain, each party's encrypted CEK is removed from the metadata, and relating to this field, the $1^{st}$ party will be no longer be able to access or decrypt the CEK and thereby unable to decrypt the data contained within the block.

Element 602 represents the field which maintains state for the $2^{nd}$ party's encrypted CEK. This element and field has the same characteristics as element 601 except it relates to the $2^{nd}$ party exclusively.

Element 603 represents the field which maintains state for the $n^{th}$ party's encrypted CEK. The $n^{th}$ party is the general description where there are n parties authorized to modify the metadata of a block. For example, n may be 2 in a peer to peer transaction that utilizes the blockchain in an embodiment, or a n may higher number when there are multiple participants in a transaction. This element and field has the same characteristics as element 601 except it relates to the n party exclusively.

Element 604 represents the field which maintains state for the $1^{st}$ party's submitted secret. When requesting a rescission of access to a block or blockchain, or agreeing to such a request, the $1^{st}$ party may submit their secret share of the obsolescence lock's private key. Said secret share may be written into this field in the metadata. In preferred embodiments, the design of the secret sharing algorithm is such that having access to a number of secret shares below the required minimum number is not enough to reconstruct the secret (the private key of the obsolescence lock).

Element 605 represents the field which maintains state for the $2^{nd}$ party's submitted secret. This element and field has the same characteristics as element 604 except it relates to the $2^{nd}$ party exclusively.

Element 606 represents the field which maintains state for the $n^{th}$ party's submitted secret. The $n^{th}$ party is the general description where there are n parties authorized to modify the metadata of a block. This element and field has the same characteristics as element 604 except it relates to the $n^{th}$ party exclusively.

Element 607 represents the field which maintains state for the public key portion of the obsolescence lock. When the obsolescence lock is fully applied to a block or blockchain, said public key is used in conjunction with the private key that is reconstructed from the submitted secret shares. Once instantiated, the public key is henceforth made available in the metadata for validation of any element of the system that purports to have been signed by the reconstructed private key.

Element 608 represents the field which maintains state for the hashsum of the metadata. The hashsum of the metadata may be calculated using a hash function or hash algorithm that uses the other fields of the metadata as input. This hashsum, in conjunction with the signature of the modifying party contributes to the validation of the metadata, and ensuring the contents have not been changed either by a malicious party or in error.

Element 609 represents the field which maintains state for the predecessor's hashsum of the metadata. The predecessor's hashsum is the hashsum of the metadata made prior to the most recent change(s). The predecessor's hashsum is signed by the author of the most recent change(s), enabling an accountable history when validated during replication in conjunction with the state of the obsolescence lock.

Element 610 represents the field which maintains state for the signature of the last modifier of the metadata. In preferred embodiments, the metadata may be signed with the private key of the latest modifying party. This signature is used in the verification of changes and acts as proof of the identity of the modifying party.

Element 611 represents the field which maintains state for the authorized signatures. In preferred embodiments, the authorized signatures are the set of public signatures that relate to each respective party that is authorized to modify the metadata and associated block or blockchain. In other exemplary embodiments, there may be a set of authorized actions that each party may perform, for example only a limited number of parties could request rescission of access to a block's data, while all authorized parties may agree to such a request.

FIG. 7 illustrates a high-level example of an implementation of preferred embodiments, where an obsolescence lock has been applied to a block in a blockchain. In this example, there are only 2 parties involved, and a shorter 3-step confirmation process.

Element 701 is the first block in the blockchain, the "genesis block". The genesis block may itself point to another block, or as in this example, contains information from a published and dated source of data.

Element 702 is the second block in the blockchain. In this example this block contains data, access to which has been by the application of the obsolescence lock.

Element 500 is the predecessor hashsum 500, from FIG. 5 which is a reference to the previous block in the blockchain. The predecessor hashsum 500, FIG. 5 is used to validate the chain of data has not been modified.

Element 703 is the request to rescind block. This instruction block was created by one of the authorized parties in order to begin the rescission process and apply the obsolescence lock. This request block was signed by the party which created it as proof of identity. Element 703 is connected to its immediate predecessor block in the blockchain through a predecessor hashsum 500, FIG. 5.

Element 704 is the agree block which agrees to the request to rescind. This agree instruction block was created by the second party in this example, and signed with said party's private key. Element 704 is connected to its immediate predecessor block in the blockchain through a predecessor hashsum 500, FIG. 5.

Element 705 is the confirm keys destroyed block which indicates the removal of all parties' encrypted CEKs from the metadata is complete. This instruction block is signed with the reconstructed private key of the obsolescence lock as proof that the authorized method has been followed.

Figure 8:
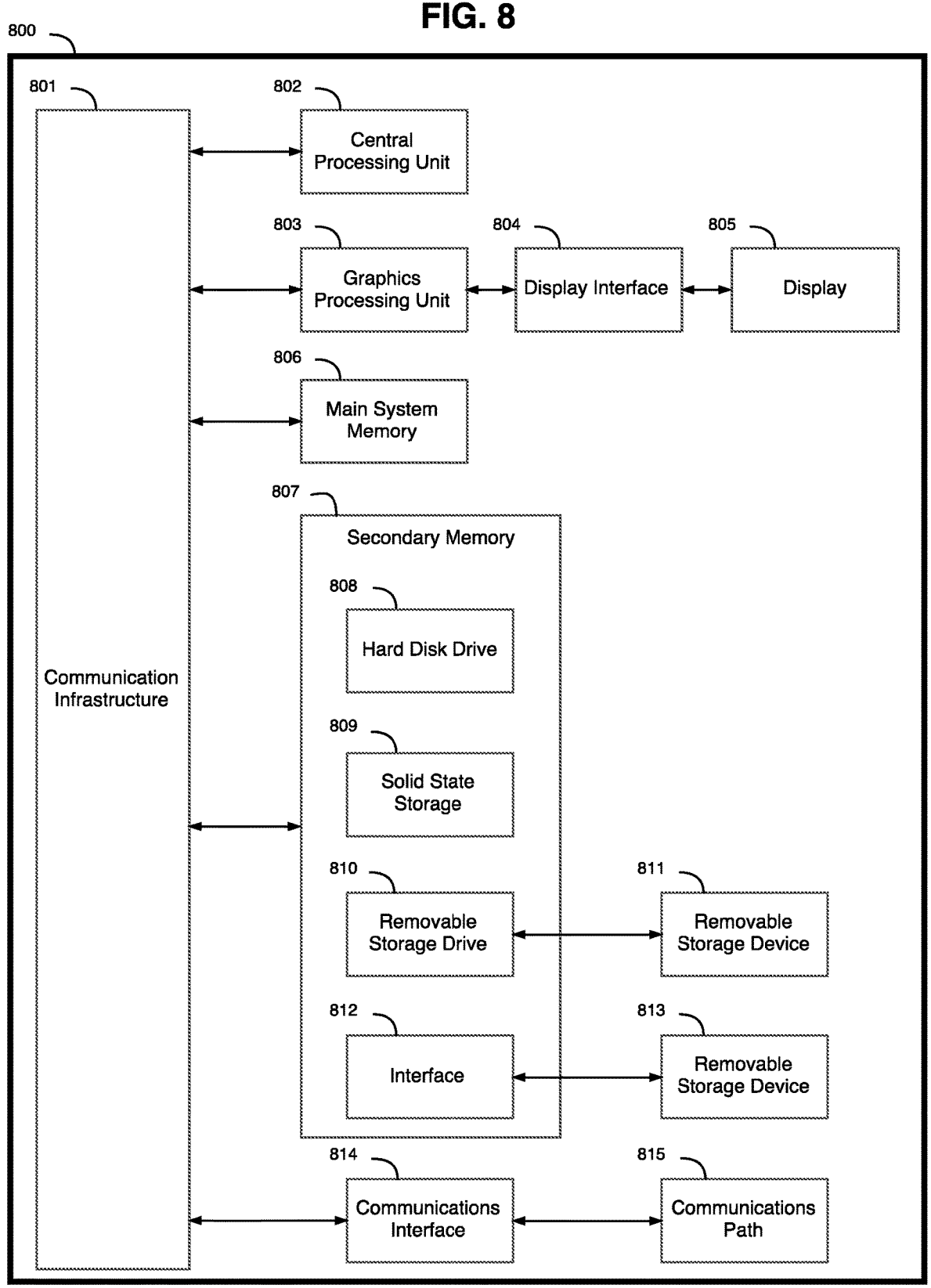
FIG. 8 illustrates an example of a high-level system architecture for a computer or similar processing and display device according to various embodiments described herein

FIG. 8 illustrates a computer system 800 in which embodiments of the present disclosure, or portions thereof, may be implemented as computer-readable code. For example, the access device 200, web server 203, the host processing systems for data management, storage, and communication software 208, other merchant and external systems 210 of FIG. 2 may be implemented as a computer system 800 using hardware, software, firmware, non-transitory computer readable media having instructions stored thereon, or a combination thereof and may be implemented in one or more computer systems or other processing systems.

Hardware, software, or any combination thereof may embody modules and components used to implement the methods of figures FIG. 1 through FIG. 7 (inclusive).

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 810, a removable storage unit 811, and a hard disk installed in hard disk drive 808 or solid-state storage device 809.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Central processing unit 802 may be a special purpose or a general-purpose processor device. The central processing unit 802 may be connected to a communication infrastructure 801, such as a bus, message queue, network (e.g., the network 207), multi-core message-passing scheme, etc. The computer system 800 may also include a main memory 806 (e.g., random access memory, read-only memory, etc.), and may also include a secondary memory 807. The secondary memory 807 may include the hard disk drive 808, solid state memory 809 and a removable storage drive 810, such as a floppy disk drive, a magnetic tape drive, an optical disk drive, a flash memory, etc.

The removable storage drive 810 may read from and/or write to the removable storage unit 811 in a well-known manner. The removable storage unit 811 may include a removable storage media that may be read by and written to by the removable storage drive 810. For example, if the removable storage drive 810 is a floppy disk drive, the removable storage unit 811 may be a floppy disk. In one embodiment, the removable storage unit 811 may be non-transitory computer readable recording media.

In some embodiments, the secondary memory 807 may include alternative means for allowing computer programs or other instructions to be loaded into the computer system 800, for example, the removable storage unit 813 and an interface 812. Examples of such means may include a program cartridge and cartridge interface (e.g., as found in video game systems), a removable memory chip (e.g., EEPROM, PROM, etc.) and associated socket, and other removable storage units 813 and interfaces 811 as will be apparent to persons having skill in the relevant art.

Computer program medium and computer usable medium may refer to memories, such as the main memory 806 and secondary memory 807, which may be memory semiconductors (e.g. DRAMs, etc.). These computer program products may be means for providing software to the computer system 800. Computer programs (e.g., computer control logic) may be stored in the main memory 806 and/or the secondary memory 807. Computer programs may also be received via the communications interface 814. Such computer programs, when executed, may enable computer system 800 to implement the present methods as discussed herein. In particular, the computer programs, when executed, may enable central processing unit 802 to implement the methods illustrated by figures FIG. 1 through FIG. 7 (inclusive), as discussed herein. Accordingly, such computer programs may represent controllers of the computer system 800. Where the present disclosure is implemented using software, the software may be stored in a computer program product and loaded into the computer system 800 using the removable storage drive 810, interface 812, and hard disk drive 808, solid state storage 809, or communications interface 814.

The computer system 800 may also include a communications interface 814. The communications interface 814 may be configured to allow software and data to be transferred between the computer system 800 and external devices. Exemplary communications interfaces 814 may include a modem, a network interface (e.g., an Ethernet card), a communications port, a PCMCIA slot and card, etc. Software and data transferred via the communications interface 814 may be in the form of signals, which may be electronic, electromagnetic, optical, or other signals as will be apparent to persons having skill in the relevant art. The signals may travel via a communications path 815, which may be configured to carry the signals and may be implemented using wire, cable, fiber optics, a phone line, a cellular phone link, a radio frequency link, etc.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

REFERENCES (INCORPORATED HEREIN BY REFERENCE)

US 20080040602 entitled Systems and methods for public-key encryption for transmission of medical information by Williams et al, filed May 10, 2007.
US 20070005978 entitled "Digital signatures for network forms" by O'Connor et al. filed Jun. 29, 2005.

What is claimed is:

1. A computer-implemented method for rescinding access to a block within a blockchain, the blockchain comprising one or more blocks, the method comprising the steps of:
   identifying, at a time a block is created, an obsolescence lock to indicate operability for a rescission request to be applied to the block, the block associated to one or more encrypted CEKs;
   splitting a private key associated with the obsolescence lock into a plurality of secret shares, each secret share associated to a user device of a plurality of user devices, the plurality of user devices authorized to access the block;
   transmitting a secret share, of the plurality of secret shares, to each user device, of the plurality of user devices;
   receiving, from a first user device, of the plurality of user devices, a submission of an instruction block requesting the rescission request, the recission request associated with the block;
   receiving, from the first user device, a first secret share of the plurality of secret shares;
   iteratively receiving, from at least a portion of the plurality of user devices, a submission of additional instruction blocks, the additional instruction blocks associated with an agreement to the rescission request, each additional instruction blocks comprising a secret share associated with a corresponding user device of the plurality of user devices;
   upon receiving, from at least a portion of the plurality of user devices, a pre-configured required quantity of additional instruction blocks:
      executing a reconstruction of the private key, by a last user device of the at least portion of the plurality of user devices, the reconstruction based on a plurality of received secret shares associated with the additional instruction blocks, the last user device being an agreeing party that inclusively provided the pre-configured required quantity of additional instruction blocks; and
      removing the one or more encrypted CEKs, the one or more CEKs associated to the block;
      create a confirmation block, the confirmation block indicating that the one or more encrypted CEKs have been removed from the block, the confirmation block signed with the reconstruction of a private key associated with the first user device;
      submit the confirmation block to the blockchain.

2. The method of claim 1, wherein each additional block is signed with a private key associated with a corresponding user device of the at least portion of the plurality of user devices.

3. The method of claim 1, further comprising the step of signing each additional block with a private key associated with a corresponding user device of the at least portion of user devices.

4. The method of claim 2, further comprising the step of submitting each secret share into metadata associated with the block.

5. The method of claim 1, wherein the confirmation block is unencrypted.

* * * * *